United States Patent [19]  [11] 4,203,664
Clifton et al.  [45] May 20, 1980

[54] FILM POSITIONING APPARATUS

[75] Inventors: Jerry L. Clifton; Ralph Gentile, both of Rochester; Russell G. Hurlbut, Hilton; James L. King, Rochester, all of N.Y.

[73] Assignee: Eastman Kodak Company, Rochester, N.Y.

[21] Appl. No.: 931,350

[22] Filed: Aug. 7, 1978

[51] Int. Cl.² .............. G03B 27/32; G03B 27/76; G03B 27/62
[52] U.S. Cl. .................. 355/64; 355/71; 355/75
[58] Field of Search .......... 355/18, 50, 64, 67, 355/72-77, 40, 99, 71, 98; 274/40, 10 E, 10 S

[56] References Cited

U.S. PATENT DOCUMENTS

| 634,025 | 10/1899 | Robinson | 274/40 X |
|---|---|---|---|
| 1,794,279 | 2/1931 | Daugé | 355/40 |
| 2,443,281 | 6/1948 | Terry | 355/64 X |
| 2,494,495 | 1/1950 | Tait et al. | 355/72 X |
| 2,911,884 | 11/1959 | Caudle et al. | 355/40 UX |
| 2,933,030 | 4/1960 | Bornemann | 355/99 |
| 3,073,214 | 1/1963 | Haviland | 355/75 |
| 3,094,036 | 6/1963 | Benson | 355/40 UX |
| 3,292,485 | 12/1966 | Mey | 355/18 |
| 3,418,042 | 12/1968 | Sigl | 355/76X |
| 4,027,968 | 6/1977 | Spence-Bate | 355/71 X |
| 4,056,321 | 11/1977 | Gensike et al. | 355/99 |

FOREIGN PATENT DOCUMENTS 219555 3/1910 Fed. Rep. of Germany ........ 274/10 E

Primary Examiner—Donald A. Griffin
Attorney, Agent, or Firm—D. M. Woods

[57] ABSTRACT

Film positioning apparatus is provided for supporting and positioning a disk-shaped film unit, having a plurality of images, in several spaced work positions on a photographic printer, including one position where the film unit is supported adjacent the printing gate aperture. When positioned adjacent the printing gate aperture, the supported film unit is rotationally indexed to position selected images in the aperture.

9 Claims, 7 Drawing Figures

FILM POSITIONING APPARATUS

BACKGROUND OF THE INVENTION

1. Field of the Invention

The invention generally relates to apparatus for positioning a plurality of information-containing photographic units in cooperative apparatus intended for utilizing or processing the information. More particularly, the invention relates to apparatus for positioning film units relative to functional elements of a photographic printer.

2. Description Relative to the Prior Art

The invention has particular utility when it is applied to the positioning of disk-shaped film units in a photographic printer. Printers for handling conventional strip film formats are generally adapted to position negatives either singly or in strips in a printing gate aperture. For example, with the commercially available Eastman Kodak 5S printer, the operator typically inserts a negative, or a film strip, into a negative holder in the gate for printing. This step is initiated by depressing a foot treadle. The upper half of the negative holder is connected to a movable yoke that is controlled by the treadle. The yoke rises allowing access to the interior of the negative holder. The operator places a negative, or a strip of negatives, between guides in the holder. A detent precisely locates the perforated edge of the strip, or negative, relative to the printing gate aperture. Then the upper half of the negative holder is lowered into place. The operator examines the negative frame, now held in the printing gate aperture, and enters color and/or density correction for the frame via keyboard, and printing is initiated.

Another version of film strip handling is used in the commercially available Eastman Kodak 2620 and 2610 printers. In both printers, separate strips of given size negatives are spliced together to form spliced rolls. The roll is mounted on the machine, together with a take up reel, and each negative is automatically, and intermittently, advanced along a negative track through a printing station. As single negatives are being printed, the strip of spliced negatives is wound upon the take up reel. Such a mode of handling the film strips provides increased efficiency in the printing operation since individual operator handling for each negative or strip is eliminated.

Strip handling apparatus is not satisfactory in certain printing situations. For example, in U.S. Pat. No. 3,292,485 a printer is disclosed that is capable of handling at least two different sizes of negatives. Since the various size negatives can neither be spliced into rolls nor handled by a single size negative holder, this printer disposes the negatives around the rotational axis of a rotary negative holder. The rotary holder has several apertures for receiving different sized negatives. By rotating the holder, each negative is sequentially positioned in the printing gate for printing. A similar approach is disclosed in U.S. Pat. No. 4,056,321. There separate microfiche negatives are held on a pair of platens mounted on a rotatable carrier. By positioning the carrier adjacent to the printing gate of a microfiche duplicator, one platen—and its microfiche—is in the duplicator gate while the other platen is disposed for loading or unloading of microfiche.

Applying a similar concept, U.S. Pat. No. 1,794,279 discloses a rotary negative holder for positioning several frames on a single sheet of film adjacent to the printing objective of a printer. Eight images of an identical scene are spaced about the geometric center of a square film sheet. The sheet is mounted on a rotary support for rotation about an axis that coincides with the geometric center of the sheet. Therefore, by rotating the support, each image is sequentially registered adjacent to the printing objective.

In positioning a disk-shaped film unit having a plurality of image frames, the apparatus described above do not satisfactorily provide the productivity necessary for economical and efficient printing. Imitating strip film by joining the units together in any manner, if possible at all, would obviously be cumbersome. One would expect that the film units can best be handled individually. FIGS. 1 and 2 pertain to apparatus based on known principles for selectively positioning individual frames of a rotatable disk-shaped film unit relative to a printer gate aperture. Specifically, a spring-like lever 10 is attached to a gear 12. A gear 14 (meshed with the gear 12) is attached to a spindle 16 upon which the film unit 18, by means of a suitable keying arrangement, is removably assembled. A stationary index positon plate 20 has a plurality of notches or recesses 22 (corresponding in number to the number of frames on the film unit) to accommodate the lever 10 biased against the underside of the plate 20. By depressing the lever 10 and moving it to the desired frame number notch, the film unit rotates and places the corresponding frame in a printer gate aperture 24 (shown in phantom).

FIGS. 1 and 2 represent a low speed approach to printing from a disk-shaped film unit. Each image is manually advanced into the printer gate aperture. Furthermore, once an image is adjacent the printer gate, it is manually classified as to scene type before printing may begin. Therefore, and particularly since printing is often the bottleneck with regard to photofinishing efficiency, whether printing from individual negatives or spliced rolls of strip film, the apparatus illustrated in FIG. 1 is likely to be satisfactory only for small photofinishing operations.

SUMMARY OF THE INVENTION

In accordance with the invention apparatus is provided for positioning a film unit, having a plurality of images, in a plurality of spaced work positions. One of the positions is proximate an illumination gate. Means are provided for moving the film unit relative to the supporting means to position selected frames of the supported film unit in the illumination gate.

In the disclosed embodiment of the invention apparatus is provided for positioning a disk-shaped film unit in a plurality of spaced positions in a photographic printer including a first position at which the images are viewed and classified and a second position at which the images are individually exposed. The apparatus includes a viewing gate positioned proximate the first position and a printing gate positioned proximate the second position, means for supporting the film unit and means for moving the supporting means to successively position the film unit in the first and second positions. Means are provided for moving the unit relative to the supporting means in the second position to position selected images of the supported film unit in the printing gate.

Apparatus in accordance with the present invention employs a double pivoting concept. Each film unit is adapted for rotation about an axis passing through the film unit itself. In addition, each film unit is mounted on a support, also referred to as a positioner, which is itself disposed for rotation about an axis spaced from the film unit. The invention thus contemplates a form of compound rotation wherein the film unit is capable of movement relative to the film unit positioner.

Figure 1:
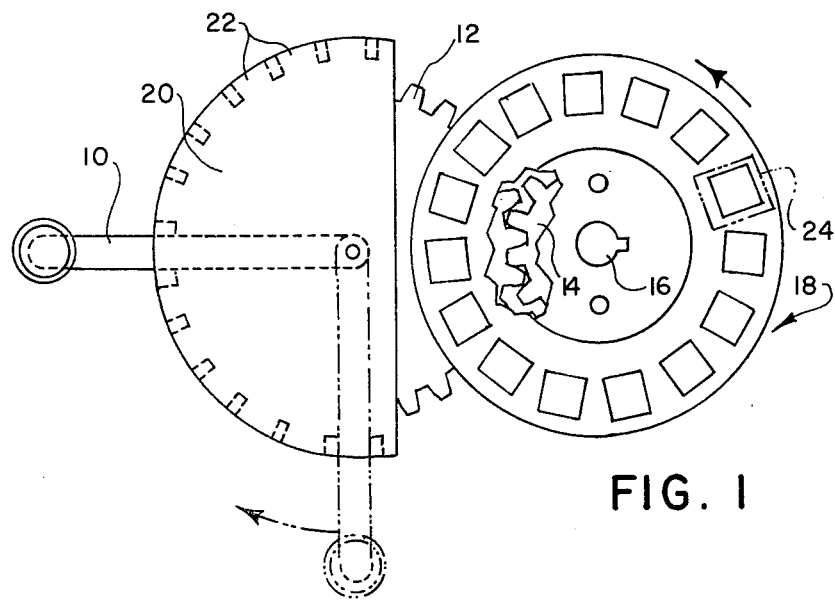
FIG. 1 is a top elevation of apparatus based on known principles for positioning a single film unit relative to a printer gate aperture.
Figure 2:
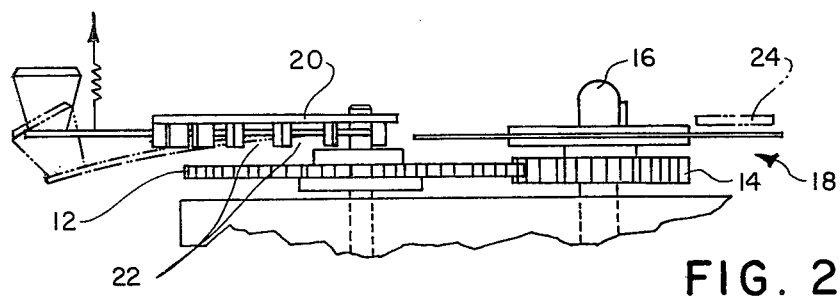
FIG. 2 is a side elevation of the apparatus illustrated in FIG. 1.
Figure 3:
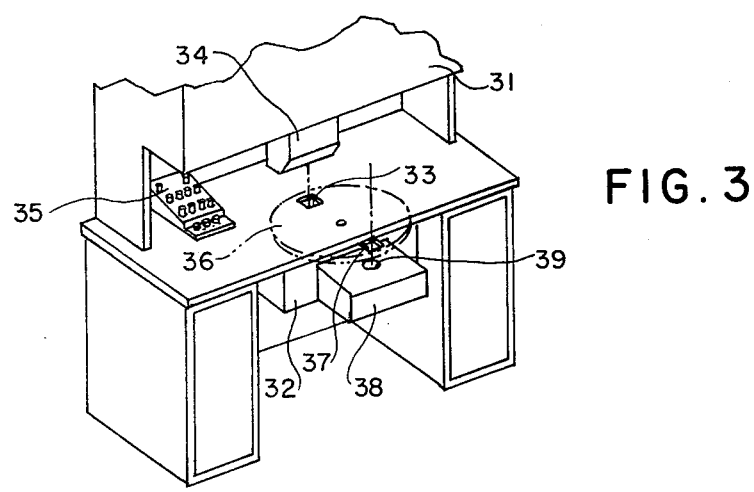
Figure 4:
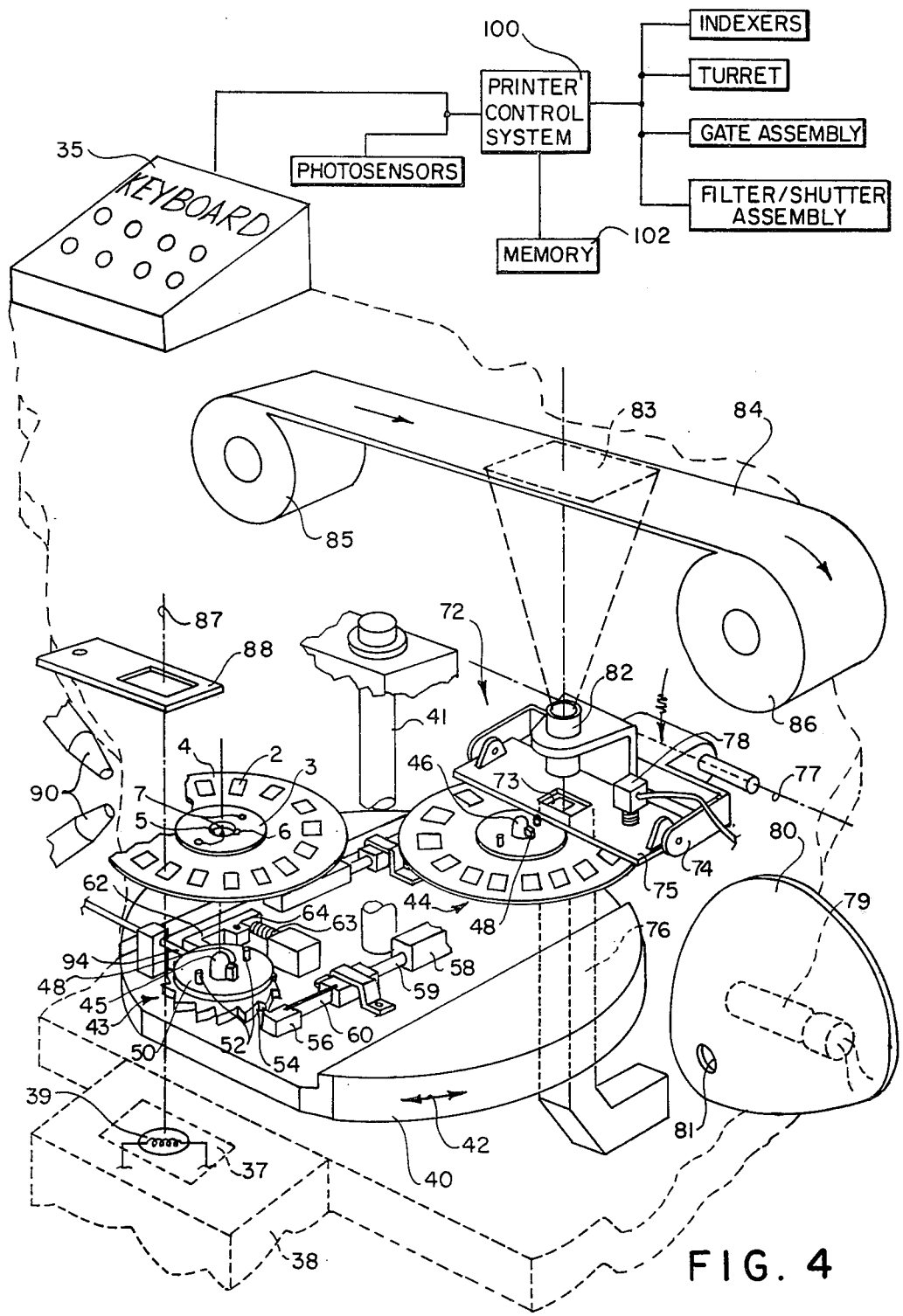
Figure 5:
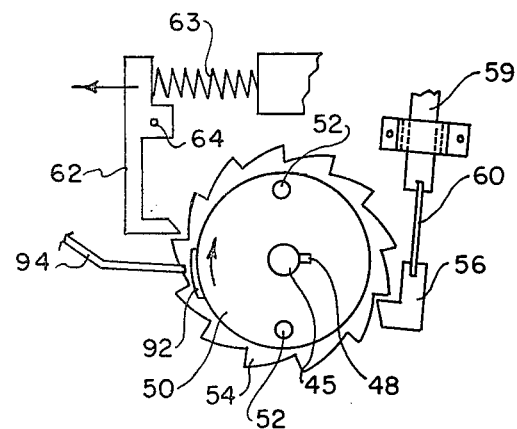
Figure 6:
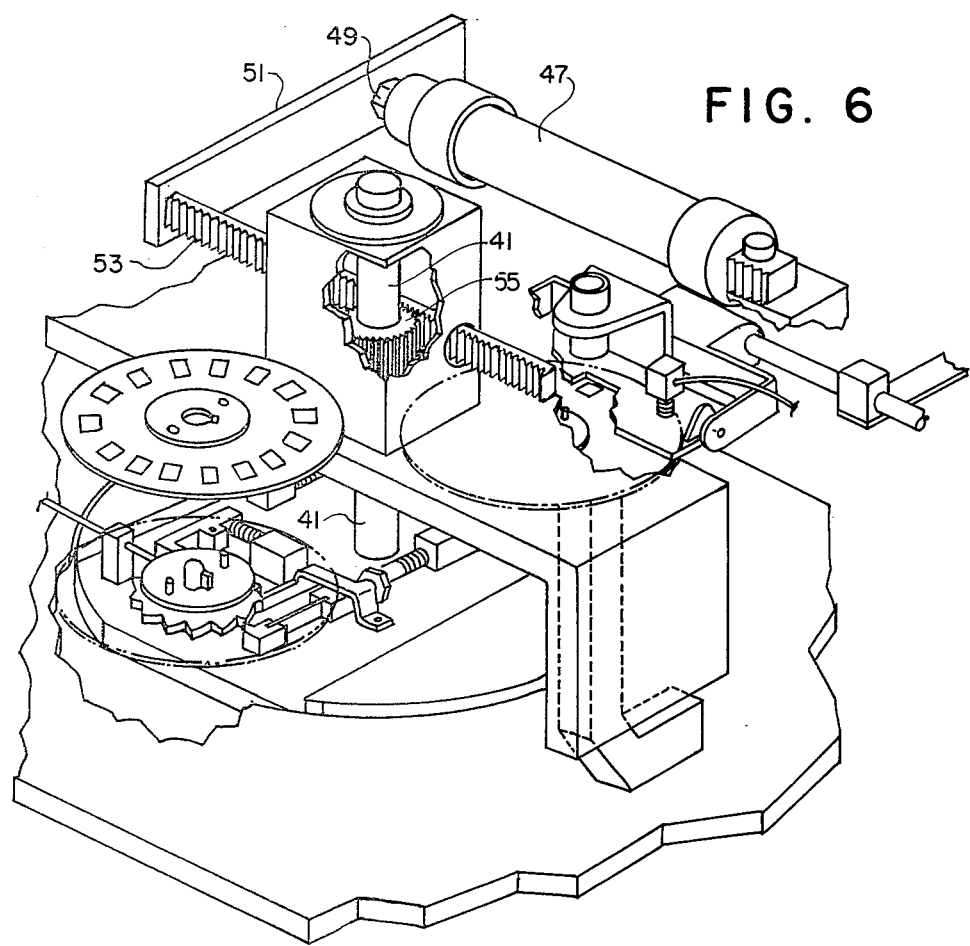
Figure 7:
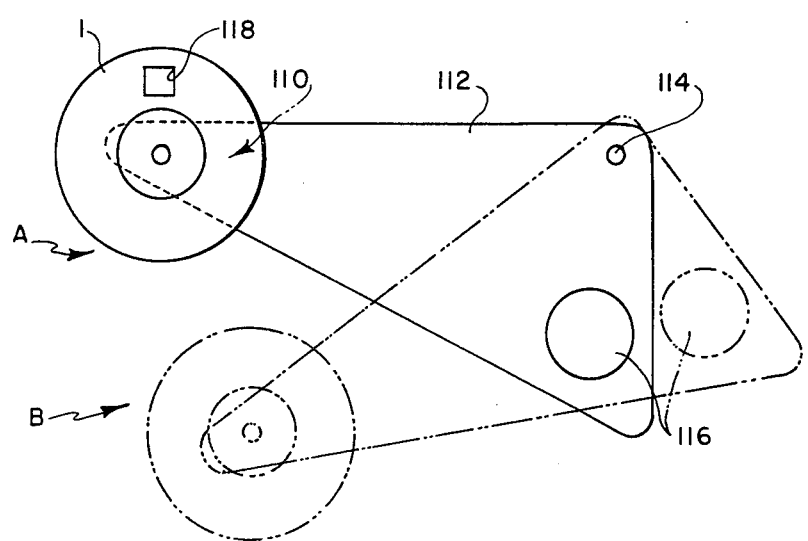

A preferred embodiment of the invention will be described with reference to the figures, wherein:

FIG. 3 is a perspective view of a known photographic printer adapted for use with the disclosed embodiment of the invention;

FIG. 4 is a partial perspective view of a presently preferred embodiment of the invention;

FIG. 5 is a top elevation of a portion of the disclosed embodiment showing mechanism for rotating a film unit;

FIG. 6 is a perspective view of a pneumatic drive apparatus for use with the disclosed embodiment; and FIG. 7 is a top elevation of a further embodiment of the invention.

DETAILED DESCRIPTIO OF THE INVENTION

Because photographic printers in general are well known, as are other types of copiers, the present description will be directed in particular to elements forming part of, or cooperating more directly with apparatus in accordance with the present invention. Elements not specifically shown or described may take various forms well known to those skilled in the art.

Image frames on a photographic unit may be utilized in numerous ways without affecting the structure of the photographic unit. For example, in the case of microfilm images, the image is typically in the form of a reduced document. This document image may, for example, be illuminated and projected upon a screen for viewing. Alternatively the image may be illuminated and projected upon a copy plane in which copy material is exposed for making duplicate copies. In other applications, an image frame may be scanned by a flying spot scanner to sense density variations. Electrical impulses corresponding to these variations may be processed through conventional electronic circuits and drive a display device, such as a cathode ray tube, for recreating the image represented on the frame. Film positioning apparatus in accordance with the invention may be used to position a film unit, and individual images on the unit, for these various purposes; the disclosure of a preferred embodiment of the invention in connection with a photographic printer is therefore to be considered exemplary only.

Furthermore, the disclosed embodiment primarily concerns the positioning of a film unit in and adjacent to the printer gate aperture of a photographic printer. A film unit used in this manner is typically a photographic negative transparency, although a positive transparency or a reflection print can be considered to be equivalent to negatives for purposes of the disclosed embodiment. In the case of a reflection print the illumination system would be different from that designed for transparencies, but these changes are within the capability of those skilled in the art.

The disclosed embodiment is described in relation to a disk-shaped film unit 1 (see FIG. 4) having a plurality of images 2 disposed on the unit for selective and separate positioning in a printing gate. The film unit 1 includes an annular hub member 3 and a disk-shaped film member 4 carried by the hub 3. The hub includes a spindle aperture 5 for receiving a spindle shaft (which will be described). A keyway 6 is formed on the side of the aperture 5 and a pair of locating apertures 7 are formed in the hub 3. The images 2 are disposed on the film disk 4 about the hub 3. The film unit 1 is further described in copending application Ser. No. 774,716, filed Mar. 7, 1977 in the name of D. Harvey and Ser. No. 931,053, filed Aug. 4, 1978 in the name of G. Sethi, both assigned to the assignee of the present application. The disclosed embodiment is particularly useful where various activities occur relative to the film unit while it is supported by the positioner. These activities may include such representative functions as loading the film unit upon the positioner, classifying each image frame for density and/or color correction, removing dust from the film unit, printing individual frames from the unit and unloading the film unit from the positioner. However, some of these functions may be spatially combined, such as loading and classifying, so that several of these functions may occur in one location.

Referring now to FIG. 3, there is shown in phantom a view of the film positioning apparatus of the present invention applied to a photographic color printer 30 such as a Kodak Model 5S-5 printer. The printer 30 may be equipped with roll paper supply and take-up magazines and apparatus for advancing a roll of photosensitive photographic print material from the supply magazine through the exposure station of the photographic printer to the take-up magazine, all such components being enclosed in a light-tight cabinet 31. The color printer is also equipped with an exposure lamphouse 32 located beneath the table of the photographic printer and operative to project printing light through a negative positioned in a printing aperture 33 of the printer 30. The printing light beam directed through the photographic negative is projected by projection lens encased in a lens assembly housing 34 onto the photosensitive photographic print material located in the print exposure station within the light-tight cabinet 31.

Three subtractive primary color filters may be located within the housing 34 and are operative, in conjunction with associated exposure control circuits, to terminate exposure of the photosensitive print material to light of the three respective primary colors passing through the negative. These color exposures are terminated after respective time periods dependent upon the intensities of such primary colors of light detected by three respective primary color measuring photosensors. A keyboard assembly 35 is provided with a number of subject classification and color correction buttons that the operator of the printer may depress to alter the exposure parameters to produce a commercially acceptable print from a negative that requires classification and correction. The construction and operation of the Kodak Model 5S-5 Printer is described in greater detail in the operation manual published by the Eastman Kodak Company (i.e., Publication 638239, "Operating the Kodak Color Printer Model 5S-5", June 1976).

The disclosed embodiment of the film positioning apparatus is shown in phantom and identified by reference marker 36 in FIG. 3. The film positioner 36 extends adjacent the printer gate aperture 33 and a classification aperture 37 which is illuminated from below by a classification lamphouse assembly 38 having a lamp 39 positioned adjacent the aperture 37.

Referring now to FIG. 4, the preferred embodiment of the invention includes a turret 40 mounted for rotation by a shaft 41 in the directions indicated by the arrow 42. The shaft 41 supports the turret 40 in relation to the printer work surface (shown in phantom in FIG. 4) of the printer 30. The shaft 41 is coupled to suitable drive apparatus, which may take the form shown in FIG. 6. More specifically a pneumatic cylinder 47 includes a piston 49 attached to a drive block 51. One end of a rack gear 53 is also attached to the drive block 51, the other end mating with a pinion gear 55 on the drive shaft 41. The drive apparatus moves the shaft 41 in successive half-revolution movements, the turret 40 being rotated 180° in one half-revolution movement and returned 180° in the next half-revolution movement. This reciprocating 180° movement simplifies electrical and pneumatic connections between moving and sensing parts on the turret 40 and associated stationary control mechanisms external of the turret. However continuous rotation of the turret 40 could be maintained if the requisite connections were set up accordingly, e.g., brush and commutator electrical connections.

Referring again to FIG. 4, a pair of substantially identical indexing mechanisms 43 and 44 are mounted on the turret 40 for rotation about respective spindle shafts 45 and 46. A number of the components of the indexers 43 and 44 are substantially identical, and it is to be understood that such parts will function in a like manner. The layout of the indexer components is additionally illustrated in the FIG. 5 detail. Each spindle shaft 45 and 46 includes a key 48. Each indexer includes a support plate 50 having locating pins 52 spaced from the respective spindle shafts 45 and 46. The support plate 50 is in turn mounted for rotation on a ratchet gear 54. A pneumatically operated drive pawl 56 is provided for driving the ratchet gear. The pawl is connected to pneumatic cylinder 58 by a piston 59 and a flexible member 60. Disposed opposite the drive pawl 56 is a detent 62, which is biased by a spring 63 to rotate about a pivot 64 and against adjacent gear teeth on the ratchet gear 54.

A negative gate assembly 72 is provided on the printer 30 for enclosing a printer gate aperture 73. The assembly 72 includes a yoke 74 and a pressure plate 75 for positioning the film disk 4 adjacent the top surface of an integrating bar 76. The yoke 74 is pivoted about axis 77 by drive means (not shown) so that the pressure plate 75 may be raised and lowered to allow separate images 2 to be positioned in the aperture 73. An air inlet 78 is included in the pressure plate 75 to assist in cooling the film disk 4.

The optical system of the printer 30 includes a lamp 79 enclosed within an ellipsoidal reflector and backing mirror 80. Rays from the lamp 79 pass through an aperture 81 in the reflector 80 and, from there, are reflected and diffused by the integrating bar 76. The diffuse rays emerge at the printer gate aperture 73 and impinge on an image area 2 positioned in the aperture. Image light emerging from the image 2 is focused by a lens 82 upon an image plane 83 disposed on the surface of photographic paper 84. The paper extends between a roll paper supply reel 85 and a take-up reel 86 enclosed within the light-tight cabinet 31 illustrated in FIG. 3.

The classification aperture 37 is located adjacent the classification lamphouse assembly 38 and defines a classification axis 87. Light from the lamp 39 illuminates a selected image area or frame 2 and the resultant image light is image on a frame viewer 88 from where it is visually observed. Operator judgements regarding negative classification are entered via the keyboard assembly 35 into an electronic control system 100 of the printer. In addition, the operator can enter the number of prints desired for each frame.

In operation, a film unit 1 is placed on the indexer 43 by the printer operator. The hub 3 is so configured that the locator apertures 7 and the central aperture 5 mate with the locator pins 52 and the spindle shaft 45. The film unit 1 is initially aligned on the indexer 43 by additionally mating the keyway 6 with the key 48 formed on the spindle shaft 45. In the disclosed embodiment the film disk 4 is so positioned initially on the indexer 43 that an image 2 is disposed in the visual classification axis 87.

The operator examines the first image area 2 by means of the frame viewer 88 and decides if color and/or density correction are required. If needed, the operator depresses the appropriate buttons on the key-board assembly 35. The classification data is thereupon entered into an electronic memory 102 to be stored until needed. Simultaneously, the pneumatic cylinder 58 is actuated and its associated piston retracts the drive pawl 56. One of the teeth on the ratchet gear 54 is engaged by the pawl 56 and the indexer 43 is thereby incremented an angular distance corresponding to the spacing between the images 2. The pneumatic cylinder 58 then releases its piston and the pawl 56 resumes its initial position. Meanwhile, the detent 62 has engaged one of the ratchet teeth to prevent further slight rotation. The adjoining image 2 is now in position for examination by the operator. The operator classifies the image and punches the proper correction into the keyboard assembly 35. Then the sequence of operations described in connection with the first image 2 is repeated. In this manner, each of the images 2 on the film disk 4 is successively classified.

During the course of classification the correction for each image 2, and the image location on the film disk 4, is stored in the electronic memory 102. After all the images are classified, the shaft 41 is rotated 180° or a half-revolution, by mechanism earlier described in connection with FIG. 6, so that the turret 40 likewise is turned by 180°. The partial revolution of the turret 40 interchanges the positions of the indexers 43 and 44. Where indexer 43 had previously been adjacent the classification aperture 37, it is now adjacent the printer gate aperture 73. Similarly, the indexer 44 is moved from the printer gate aperture 73 to a position adjacent the classification aperture 37.

The film unit 1 mounted on the indexer 43 now is positioned between the pressure plate 75 and the output end of the integrating bar 76. Initially, the printer gate yoke 74 is raised away from the integrating bar 76 by rotation about the axis 77. This allows space between the pressure plate 75 and the integrating bar 76 such that the film disk 4 may slip between as the turret 40 is rotated and the film unit 1 moves adjacent the printer gate aperture 73. Once in place, the control system 100 commands printing to start; the command initially disconnects the pneumatic cylinder 58 from operator control and connects it to the electronic control system. Then the classification for the first of the images 2 is retrieved from the memory 102 and inserted into the control system 100 for automatically controlling the length of printing exposure. The printer gate yoke 74 then rotates about the axis 77 so that the pressure plate 75 bears against the film disk 4 with the first of the images aligned in the printer gate aperture 73.

The dark shutter then opens, permitting the exposing beam to impinge on the photographic paper 84 along the image plane 83. Each color photosensor begins to measure its respective image color and, in accordance with operator classification for each color, signals the control system 100 to terminate exposure in that color when sufficient exposure is reached. The control system initiates insertion of the appropriate subtractive filter to terminate the complementary color exposure. When exposure terminates due to insertion of all the subtractive filters and the dark shutter into the printing beam, the pneumatic cylinder 58 is automatically enabled by the electronic control system 100 to begin incrementation of the indexer 43 to the next position at which the next image 2 is positioned in the printer gate aperture 73. At the same time, the photographic paper 84 is incremented by a distance corresponding to one print by conventional mechanism (not shown) within the capability of those skilled in this art. When the next of the images 2 is in the printer gate aperture 73, the exposure sequence repeats itself as before, the indexer 43 is again rotated, and so on. Automatic sequencing continues until the last of the images 2 on the film disk 4 is printed. Then the turret 40 is conditioned for rotation of 180°.

Meanwhile, the operator places another film unit on the indexer 44 and classifies each of the images on the film disk. The mechanical operation is the same as described before in connection with the indexer 43, except that the classification data punched into the keyboard assembly 35 may of course differ from that concerning the previous film unit. The presence of the last image on the film disk opposite the classification aperture 37 is recognized by the electronic control system 100 (for example, by a reflective patch 92 rotating into position adjacent a photosensor 94—see FIG. 5). After the operator enters classification data corresponding to the last frame in the keyboard assembly 35, the main shaft 41 is again enabled and, if the printing of the images 2 of the film disk 4 has been completed, the turret 40 is rotated by 180°. Indexer 43 is now returned to a position adjacent the classification aperture 37 and the complete sequence of operations resumes, the film unit 1 on the indexer 43 being replaced with another film unit while the film unit on the indexer 44 is being printed.

While the disclosed embodiment is illustrated for use in positioning disk-shaped film units in the printer gate aperture of a photographic printer, other applications may be suggested. For example, the film unit 1 may contain microimages of documents and the image plane 83 may be located in the plane of a viewing screen rather than on a web of photographic paper. Alternatively, the image plane 83 could be in the plane of appropriate photosensitive material for making duplicate enlarged copies of the microfilm images. In this embodiment, the position of the indexers at the classification aperture serves to facilitate loading and unloading of the microfilm unit. Since color and/or density correction may be unnecessary in this application, the operator may have but to enter the number of copies into the keyboard assembly 35.

Other operations may be performed upon the film unit 1. For example, air from the nozzles 90 (see FIG. 4) may be used to clean the film disk 4 while associated images 2 are being classified by the operator. Although the disclosed embodiment has two operative positions—classification and exposure—any reasonable number may be accommodated by such positioning apparatus. For example, two additional indexers may be installed on the turret 40 and the shaft 41 conditioned to rotate 90°, instead of 180°. The frame cleaning can then occur at a position midway between the present classification and exposure positions, while loading/unloading may also occur at a midway position, but on the opposite side of the turret 90.

As the turret 40 moves the film unit 1 into the printing gate aperture 73 (see FIG. 4), it is desirable to elevate the film disk 4 away from the light bar 76 to prevent scratching the surface of the film. Providing that the indexers 43 and 45, and the film units associated therewith, are always brought back to an initial orientation or position before rotating the turret 40 to the next work position, the film unit 1 may be raised vertically away from the turret 40 in that one orientation a sufficient distance to clear the bar 76. This is accomplished by rotating the indexers 43, 45 over a single stepped cam (not shown) disposed between the plate 50 and the turret surface. The cam step is positioned relative to the indexer 43 and 45 so that the plate 50 advances up the step only at the initial orientation of the film unit; therefore the film unit 1 is brought adjacent the printing gate aperture 73 while spaced from the light bar 76. The initial orientation is so chosen that no image is presented to the printing gate aperture 73. Advancing the film indexer further drops the plate 50, and the film unit therewith, off the cam step such that the first image area 2 now lies in the aperture 73 adjacent the bar 76. Each subsequent image area 2 then lies adjacent the bar 76; after printing the final image area, the indexer advances upon the cam step again so that the positioner is disposed for movement to the next work station.

While the invention has been described in relation to several film unit indexers on an annular turret, this embodiment is understood not to limit the invention. For example, as illustrated by FIG. 7, a film positioner in accordance with the invention includes a single indexer 110—shown in phantom but understood to be the equivalent of the indexer 43 as described in connection with FIG. 4. The indexer 110 is mounted on a triangular positioner plate 112 that is adjacent the printing gate aperture 118 and mounted for rotation about a pivot 114. A knob 116 is mounted at one corner of the triangular plate 112. By using the knob 116 to pivot the plate 112, the positioner reciprocates between position A and position B (shown in phantom). In position A, a film unit 1 is positioned in the printing gate aperture 118 of the printer; position B is useful for loading and unloading of a film unit 1.

The invention has been described in detail thereof, but it will be understood that variations and modifications can be effected within the spirit and scope of the invention.

What is claimed is:

1. Apparatus for positioning a generally disk-shaped film unit in a plurality of spaced work positions, the film unit having a hub and a plurality of images disposed around the hub, said apparatus comprising:
   means for supporting the film unit;
   means for positioning said supporting means to locate the supported film unit at each of the positions;
   means for illuminating an image of the film unit at one of the positions; and means engageable with the hub for moving the film unit relative to said supporting means in said one position to position selected images of the film unit relative to said illuminating means.

2. Apparatus for positioning a generally circular film unit in a plurality of spaced work positions in film illumination apparatus, the film unit having a central core and a plurality of images disposed around the core, said apparatus comprising:
- means engageable with the core for supporting the film unit at each spaced position in a predetermined sequence;
- means for illuminating the images of the film unit at one of the work positions; and
- means for positioning the film unit relative to said illuminating means to align selected images of the film unit with said illuminating means.

3. Apparatus for positioning a generally disk-shaped film unit in a plurality of spaced positions in a photographic printer, the film unit having a hub and a plurality of image areas disposed circularly around the hub, said apparatus comprising:
- a viewing gate positioned proximate a first of the positions;
- a printing gate positioned proximate a second of the positions;
- means for supporting the film unit;
- means for moving said supporting means to successively position the film unit in the first and second positions; and
- means engageable with the hub for moving the film unit relative to said supporting means in the second position to position selected image areas of the supported film unit in said printing gate.

4. Apparatus in a photographic printer for positioning a disk-shaped film unit in a plurality of spaced work positions, including a film viewing position and an exposure position, the film unit having a plurality of images and a central locating member for orienting the images, said apparatus comprising:
- a printing gate positioned adjacent the exposure position;
- a viewer positioned adjacent the viewing position;
- movable means for supporting the film unit at each of the plurality of spaced positions;
- means for moving said supporting means to sequentially position the film unit in the viewing position and the exposure position; and
- means adjacent each of said positions engageable with the locating member of the film unit for moving the film unit relative to said supporting means to position selected images in said viewer and in said printing gate.

5. Apparatus in a photographic printer for positioning a disk-shaped film unit in a plurality of spaced work positions, including a position preparatory to printing and an exposure position, the film unit having a hub and a plurality of image areas disposed circularly around the hub, said apparatus comprising:
- a printing gate positioned proximate the exposure position;
- movable means for rotatably supporting the film unit in each of the plurality of work positions, including the position preparatory to printing and the exposure position;
- means for moving said supporting means to move the supported film unit from the preparatory position to the exposure position; and
- means engageable with the hub for rotating the disk-shaped film unit in the exposure position to position the image areas in said printing gate.

6. Apparatus in a photographic printer for positioning a plurality of disk-shaped film units in a plurality of spaced positions, including a viewing position and an exposure position, each film unit having a central axis and a plurality of images disposed circularly around the axis, said apparatus comprising:
- a classification gate positioned proximate the viewing position to enable images to be viewed for printer exposure corrections;
- a printing gate positioned proximate the exposure position;
- means for supporting a plurality of the film units in spaced relationship;
- means for moving said supporting means to serially position each film unit in the viewing and exposure positions; and
- means on said supporting means for rotating each film unit about its central axis in the viewing and exposure positions to position selected images in said gates.

7. Film supporting apparatus in a photographic printer for positioning a plurality of disk-shaped film units in a plurality of spaced work positions, including an exposure position, each film unit having an axis of rotation and a plurality of images disposed circularly around the axis, said apparatus comprising:
- a printing gate disposed proximate the exposure position;
- a rotatable support for each film unit;
- a movable member for supporting said supports;
- means for moving said member to sequentially position each supported film unit in the exposure position; and
- means on said member engageable with each said support for rotating the support and film unit thereon about the central axis to position selected images in said printing gate.

8. The apparatus as claimed in claim 7 in which said rotatable support includes a plurality of gear teeth and said means engageable with said support comprises an element engageable with said gear teeth for rotating said support.

9. Film supporting apparatus in a photographic printer for positioning disk-shaped film units in a classification position and an exposure position, each film unit having a plurality of images, each image being viewed for printing exposure classification in the classification position and exposed for printing in the exposure position, said apparatus comprising:
- a viewing gate disposed proximate the classification position;
- a printing gate disposed proximate the exposure position;
- a movable support extending adjacent said viewing and printing gates;
- means for rotatably mounting at least two film units in spaced relationship on said support;
- means for moving said support to position one film unit in the classification position and the other film unit in the exposure position; and
- means on said support engageable with each said film unit mounting means for positioning selected images of one film unit in said viewing gate and selected images of the other film unit in said printing gate.

* * * * *